Oct. 21, 1941.   N. C. HOUSTON   2,260,028
POULTRY NEST
Filed Dec. 3, 1940   2 Sheets-Sheet 1

INVENTOR.
Norman C. Houston
BY
Webster & Webster
ATTORNEYS

Oct. 21, 1941.  N. C. HOUSTON  2,260,028
POULTRY NEST
Filed Dec. 3, 1940  2 Sheets-Sheet 2

INVENTOR.
Norman C. Houston
BY
*Webster & Webster*
ATTORNEYS

Patented Oct. 21, 1941

2,260,028

UNITED STATES PATENT OFFICE 2,260,028

POULTRY NEST

Norman C. Houston, Ripon, Calif.

Application December 3, 1940, Serial No. 368,278

2 Claims. (Cl. 119—49)

This invention relates in general to an improvement in poultry raising equipment, and in particular the invention is directed to a unique type of poultry nest.

In the raising of poultry, it is desirable that means be provided to prevent the hens from piling up in the nests, and also at certain times the poultry raiser desires to trap-nest the hens.

It is therefore the principal object of this invention to provide a unique and improved type of poultry nest arranged to permit of the entry of only a single hen into the nest whereby to assure against piling up of the hens, and in addition, to arrange the device so that it may be used selectively as a trap nest.

Another object of the invention is to provide a poultry nest having a door assembly arranged with novel snap action mechanism which operates as the hen enters the nest, and thereafter retains the door assembly in such position that another hen cannot enter such nest.

A further object of the invention is to provide a poultry nest having a grated door assembly and operative for movement to a closed position upon entry of a hen into the nest; there being a baffle plate adapted for removable engagement with such door assembly whereby to convert the device into a trap nest.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
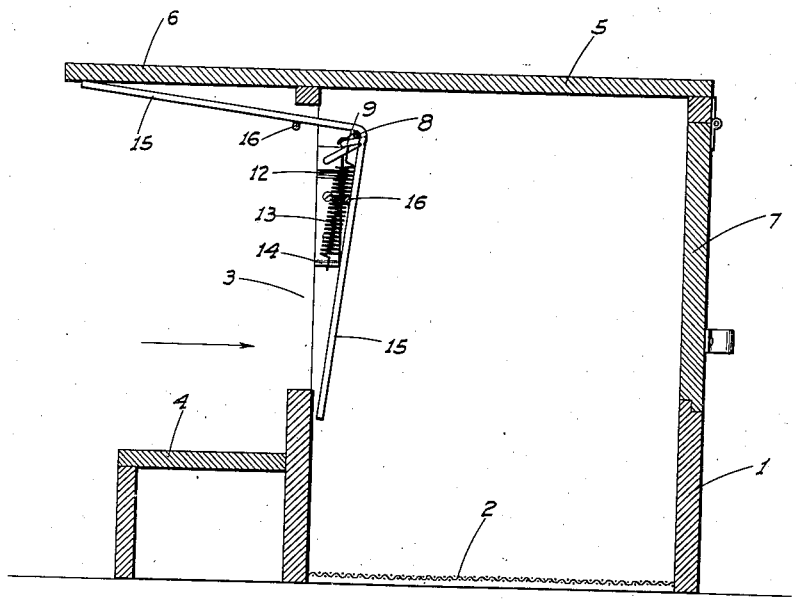
Figure 1 is a sectional elevation of my improved poultry nest, showing the door before entry of a hen into the nest.
Figure 2:
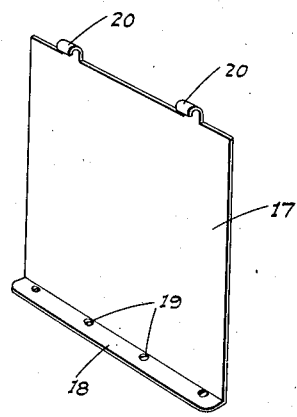
Figure 2 is a perspective view of a removable baffle plate which is used when trap-nesting is desired.
Figure 3:
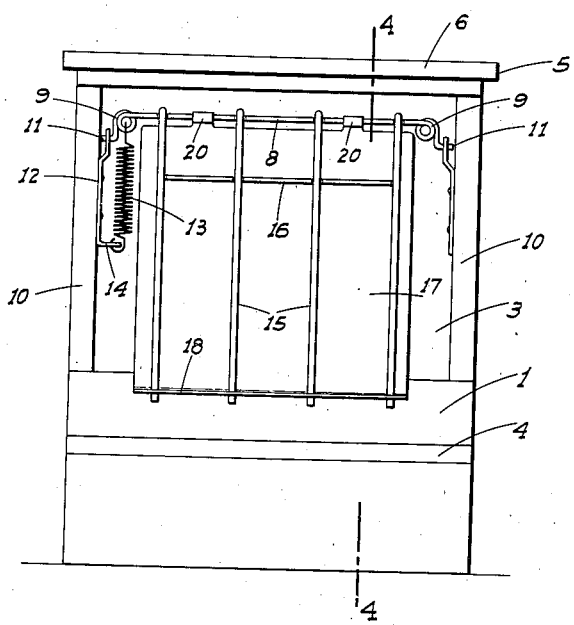
Figure 3 is a front view of the nest in closed position, and with the baffle plate supported by the door assembly, and with the door after entry of a hen into the nest.
Figure 4:
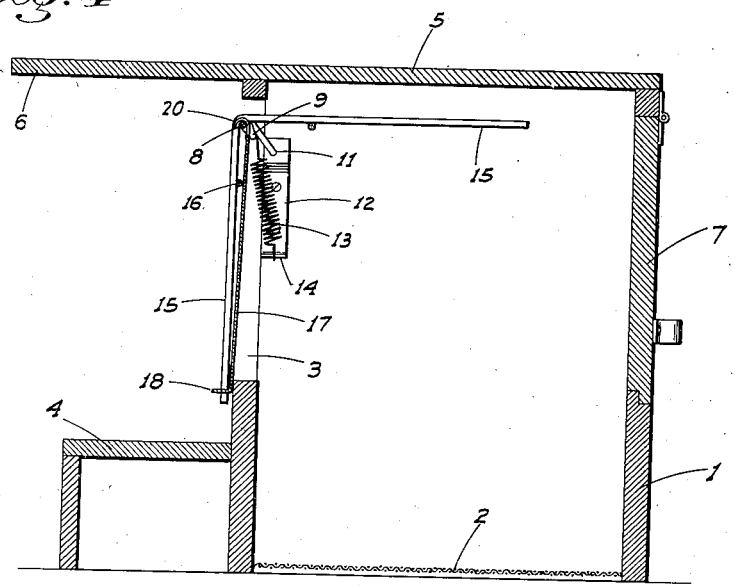
Figure 4 is a section taken on line 4—4 of Fig. 1.

Referring now more particularly to the characters of reference on the drawings, my improved poultry nest comprises a rectangular box 1, whose bottom is formed of wire mesh 2 to support the nesting material. At the front end, some distance above the bottom 2, box 1 is formed with a rectangular opening 3; there being a bench or step 4 mounted in connection with the box at the front end below opening 3 whereby hens may readily gain access to said opening. The box 1 is fitted with a top 5 which includes a projection 6 which overhangs bench 4. At the back, the box 1 is formed with a hinged door 7 so that a person can gain access to the nest, which is necessary when trap nesting.

The door assembly which is embodied in the nest comprises a horizontal rod 8 which extends from side to side of the opening adjacent the top of the latter; such rod having loops 9 formed therein adjacent but short of the sides 10 of the box, the end portions of said rod projecting in opposite directions as trunnions 11. Such trunnions are supported by brackets 12 secured on the sides 10 of the box 1 at and in vertical alinement with the forward edges of said sides.

It is to be noted that the trunnions 11 are disposed in a horizontal plane below the plane of the loops 9 and rod 8; a tension spring 13 being connected between one of said loops and an out-turned ear 14 on the lower end of one of said vertical brackets 12. It should also be noted that the ear is substantially in vertical alinement with the corresponding loop transversely of the door.

The door unit includes a plurality of rods 15 bent at right angles centrally of their ends and secured at the point of bending on rod 8 in transversely spaced relation, forming what may be termed an outward grill and an inward grill. Each grill includes a crossbar 16 to add rigidity thereto.

The rods 15 are secured on rod 8 in such relative position that when the loops 9 are offset inwardly relative to the vertical plane of the lower end of spring 13, the outer grill is disposed at an upward and outward slope from rod 8 and abuts against projection 6; the other or inner grill then depending from rod 8 and engaging the inner face of the front of the box below opening 3.

When a hen desires to enter the nest, such hen will hop up on bench 4, project her neck through the inner grill and push thereon, which moves such grill inwardly a certain distance and sufficiently to move loops 9 forwardly and past dead center relative to the spring. When this occurs, snap action movement of the door assembly takes place and the outer grill snaps down and engages the front of the box on the outside and below the opening. This closes such opening from the outside and prevents entry of any other hens into the nest.

When the hen that has entered the nest desires to escape therefrom, she merely pushes on the outer grill, which is then in closed position, producing an opposite snap action movement and the door assembly returns to its initial position.

When the nest is to be used for trap nesting, a baffle plate 17 is affixed to the outer grill by means of a flange 18 which is perforated as at 19 to receive the lower ends of the rods 15 which form such outer grill, there being spaced hooks 20 on the upper edge of plate 17 and such hooks removably engage over rod 8.

When such baffle plate is in place on the outer grill, the hen may enter the nest in the manner previously described. However, as the outer but then closed grill is covered by the baffle plate, the hen makes no attempt to butt thereagainst, and as a result remains trapped in the nest until manually released therefrom.

I am aware that snap-action door assemblies in poultry nests have heretofore been known, and I make claim only to those improvements thereover which are shown and described herein.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a poultry nest including a box having a door opening therein, a door assembly having portions disposed in end to end relation at an angle to each other, and means mounting the door assembly for snap-action swinging movement about a horizontal axis and to alternately swing said door assembly portions to closed position relative to said opening; said means comprising a horizontal transverse rod from which said door assembly portions extend substantially tangentially from the rod, the end portions of said rod being looped, bent downwardly and thence laterally outward to form oppositely projecting trunnions parallel to but below said rod and loops, brackets mounted on opposite sides of the box and rotatably supporting said trunnions, an ear projecting laterally inward from the lower end of one bracket below the corresponding loop and trunnion, and a tension spring connected at its upper end on said corresponding loop and connected at its lower end on the ear, said ear and the corresponding loop lying in substantially a vertical plane adjacent the plane of the door opening.

2. In a poultry nest, a box having a door opening, an openwork door including spaced rods unconnected at one end, means mounting the door for movement from an initially open position to closed position over said opening, other means to effect closing of the door upon entry of a hen into said box through said door opening, a baffle plate overlying said door, the plate having a flange formed on one end thereof, said flange having openings through which said unconnected ends of the rods project, and connection elements on the other end of the plate releasably engaging the door.

NORMAN C. HOUSTON.